(12) United States Patent
Rangari et al.

(10) Patent No.: US 11,365,297 B2
(45) Date of Patent: Jun. 21, 2022

(54) CRYSTALLINE NANO CELLULOSE REINFORCED CHITOSAN BASED FILMS FOR PACKAGING AND OTHER BIODEGRADEABLE APPLICATIONS

(71) Applicant: TUSKEGEE UNIVERSITY, Tuskegee, AL (US)

(72) Inventors: Vijaya K Rangari, Tuskegee, AL (US); Samia Islam, Tuskegee, AL (US); Woubit Salah Abebe, Tuskegee, AL (US)

(73) Assignee: TUSKEGEE UNIVERSITY, Tuskegee, AL (US)

( * ) Notice: Subject to any disclaimer, the term of this patent is extended or adjusted under 35 U.S.C. 154(b) by 0 days.

(21) Appl. No.: 16/239,109

(22) Filed: Jan. 3, 2019

(65) Prior Publication Data

US 2019/0203001 A1    Jul. 4, 2019

Related U.S. Application Data

(60) Provisional application No. 62/613,265, filed on Jan. 3, 2018.

(51) Int. Cl.
| | |
|---|---|
| *C08J 5/00* | (2006.01) |
| *C08J 5/18* | (2006.01) |
| *C08L 1/04* | (2006.01) |
| *C08B 15/00* | (2006.01) |
| *C08B 3/12* | (2006.01) |

(Continued)

(52) U.S. Cl.
CPC ...................... *C08J 5/18* (2013.01);
*C08B 3/12* (2013.01); *C08B 15/005* (2013.01);
*C08B 37/003* (2013.01); *C08L 1/04* (2013.01);
*C08L 1/10* (2013.01); *C08L 5/08* (2013.01);
*C08J 2301/02* (2013.01); *C08J 2401/10* (2013.01); *C08J 2405/08* (2013.01); *C08L 2201/06* (2013.01); *C08L 2203/16* (2013.01); *C08L 2205/02* (2013.01); *C08L 2205/03* (2013.01)

(58) Field of Classification Search
None
See application file for complete search history.

(56) References Cited

FOREIGN PATENT DOCUMENTS

| | | | |
|---|---|---|---|
| CN | 104861182 A | * | 8/2015 |
| CN | 104974385 A | * | 10/2015 |

(Continued)

OTHER PUBLICATIONS

CN-104974385-A—English translation (Year: 2015).*

(Continued)

*Primary Examiner* — Stefanie J Cohen
(74) *Attorney, Agent, or Firm* — Terry M. Sanks, Esq.; Beusse Sanks, PLLC

(57) ABSTRACT

A biopolymer film is provided that comprises a combination of: crystalline nano cellulose (CNC)/esterified crystalline nano cellulose (ECNC) reinforced with chitosan. The two polymer components can be present in any ratio but an approximate CNC to ECNC 70:30 ratio is preferred. The chitosan component is derived from exoskeletons of crustaceans. Also provided are methods of preparing biopolymer film and preparing food packaging components from said biopolymer film. The CNC/ECNC mixture is dissolved in an ethanol solution and the chitin is dissolved in acetic acid and mixed together to form a polymer blend.

22 Claims, 18 Drawing Sheets

(51) Int. Cl.
  *C08B 37/08* (2006.01)
  *C08L 1/10* (2006.01)
  *C08L 5/08* (2006.01)

(56) References Cited

FOREIGN PATENT DOCUMENTS

GB          1236425 A  *  6/1971  ............... C08B 3/22
WO   WO-2017046798 A1 *  3/2017  ............... C08J 5/18

OTHER PUBLICATIONS

Singh et al, Chitosan films: crosslinking with EDTA modifies physicochemical and mechanical properties, J Mater Sci: Mater Med, 23:687-695 (Year: 2012).*

Sangsuwana et al, Effect of chitosan/methyl cellulose films on microbial and quality characteristicsof fresh-cut cantaloupe and pineapple, Postharvest Biology and Technology, 49, 403-410 (Year: 2008).*

Zhuang et al, Anti-degradation gelatin films crosslinked by active ester based on cellulose, RSC Adv., 5, 52183-52193 (Year: 2015).*

CN-104861182-A—English translation (Year: 2015).*

* cited by examiner

CRYSTALLINE NANO CELLULOSE REINFORCED CHITOSAN BASED FILMS FOR PACKAGING AND OTHER BIODEGRADEABLE APPLICATIONS

RELATED APPLICATIONS

This application claims priority to U.S. Provisional Application 62/613,265, filed Jan. 3, 2018, which application is herein incorporated by reference in its entirety.

GOVERNMENT RIGHTS

This invention was made with government support under contract 1137681 awarded by the National Science Foundation. The government has certain rights in the invention.

FIELD OF THE INVENTION

The present invention relates to biodegradable films, and specifically to biodegradable, edible and antimicrobial food packaging film based on a film comprised of crystalline nano cellulose (CNC)/esterified crystalline nano cellulose (ECNC) polymer reinforced with chitosan.

BACKGROUND

Polymers are extensively used in all aspects of life that includes a wide variety of industries worldwide. Approximately 31 million tons of plastic were used in the United States in 2010 with 14 million tons used in packaging, 11 million tons used in durable goods, and 6 million tons used in nondurable goods such as disposable cups, and plates. This ubiquitous use of polymers, however, has a significant environmental impact because the dominant source of these polymers is derived from the fossil fuel industry. Petroleum-based plastics are carbon based and if this carbon were released through incineration of the polymers, or other forms of degradation, which may take thousands of years, it would result in a net increase of greenhouse gases in the atmosphere. Further, polymers have different degradation rates and only 7% of disposed plastics were recycled. Generally, 93% of plastics are end up in a landfill or are incinerated. Because polymers play a vital role in everyday life, both in industrial and commercial applications, it is necessary to produce biodegradable polymers in order to reduce the negative impact on the environment. A current focus in polymer material research is on renewable natural resources in order to accomplish this replacement of fossil fuel use. Recent years have seen an abundance of technological advances in the development of new biopolymers for medical and related applications that are also environmentally friendly. Biopolymers have attracted significant attention from researchers to replace petrochemical-based polymers, particularly in the packaging industries. Biopolymers are more favorable compared to other biostable materials because they involve degradation of long chains hydrolytically or enzymatically, resulting in polymer erosion. Based on origin, biopolymers can be broadly classified into natural and synthetic. Biopolymer based packaging mainly originates from a variety of different natural resources, including but not limited to chitin, cellulose and starch. Biopolymers have been employed in developing alternatives to petrochemical-base polymers not only because they are abundant, eco-friendly and sustainable, but also because they are very useful naturally occurring materials with attractive properties with a broad range of applications.

Food packaging is a complicated segment of the packaging systems industry. Packaging developed for this use must address food safety concerns whilst addressing environmental goals. Active packaging technologies focus on designs which expand food shelf-life. The goal of new food packaging is to control microbial growth in food while maintaining food safety and nutritional quality. Antimicrobial packaging can be adapted by incorporating an antimicrobial active agent into the packaging materials to inhibit pathogenic microorganisms and food contamination. Components of antimicrobial agents from packaging materials can migrate into the food through diffusion. It is the most convenient way to achieve antimicrobial activity by the addition of antimicrobial additives in packaging films. For example, certain solid antimicrobial additives such as silver nanoparticles, which are extensively used to incorporate antimicrobial activity, readily seep in to the food and, thusly, contaminate the food.

Therefore, there is a need for an alternative food packaging that includes a biopolymer that does not include antimicrobial agents that diffuse into the food but still offer microbial inhibition while having a positive impact on the environment.

Chitosan films have a high prospective for a variety of applications due to desirable properties, including antimicrobial activity and nontoxicity. Chitosan film has an excellent food preservation quality and highly active against growth of microorganisms such gram-positive bacteria, gram-negative bacteria and fungi. Chitin is the second most naturally abundant nontoxic biodegradable biopolymer after cellulose. Chitin is a nitrogenous polysaccharide obtained from animal origin, including skeletal outer materials of crustaceans, cuticles of insects and cell walls of certain fungus, but it is mainly extracted from the outer shell of shrimp, crabs and lobsters. Shrimp and crab shells are an abundant byproduct of the food-processing industry and provide large quantities of this biopolymer to be used in a variety of applications. Chitosan is the N-deacetylated derivative of chitin. Chitosan produced by removing the acetyl group from chitin by an alkaline treatment at an elevated temperature. Since chitosan is soluble in acidic solution, film can be readily prepared by casting, but the solubility of chitosan depends on the molecular weight and degree of deacetylation. Chitosan has a highly reactive hydroxyl and amino groups. It also has hydrogen bonding within a wide range. In addition, chitosan has significant interest due to its antimicrobial and antifungal activity and also exhibits excellent biocompatibility, flexibility, water vapor permeability, and processability.

Another component for use in biofilm is cellulose, the most abundant and reproducible biopolymer on earth. Cellulose can be derived from cell walls of plant and in bacterial cells. Cellulose is a long chain polymer composed of D-glucose units and, which are linked together by $\beta$ (1-4) glycosidic bonds. In recent decades, scientists have modified cellulose by chemical transformation. Cellulose nanocrystals (CNC) are derived from cellulose by acid hydrolysis. The amorphous regions of cellulose are more accessible to acid attack; individual cellulose nanocrystals are produced by breaking down the amorphous regions and isolating the crystalline parts. The extraction of CNC from the sustainable raw material cellulose, in a great demand due to its outstanding mechanical properties (tensile strength and modulus), large surface area to volume ratio, environmental friendly and cost-effective reinforcing agent for the composite materials. Additionally, developmental work has resulted in the functionalization of cellulose surface to create more active end groups.

Recently, it has been established that EDTA is antimicrobial active and monomeric EDTA can be easily used in a wide range of biomaterial applications by introducing with cellulose. EDTA is a powerful hexa-dentate ligand and that can easily form coordination complexes with metal cations. It has been reported that cellulose-EDTA conjugate is antimicrobial active against *Staphylococcus aureus* and *Pseudomonas aeruginosa*. This conjugate also can protect mammalian cells from bacterial cells.

While chitosan films exhibit good mechanical and oxygen barrier properties, chitosan film also exhibit unwanted characteristics such as being rigid and having poor tensile strength.

It would be desirable to provide a biopolymer film that has improved chemical and physical properties that can be used for various applications, including food packaging as well as other various industrial applications, including but not limited to food storage containers, refuse bags, shopping bags, medical packaging, drug sachets, and diapers that can be collected and composted. Such a biofilm would decrease the use of petroleum sourced polymers while reducing the overall environmental cost by providing a degradable biofilm that may be used for a variety of alternative uses.

It would also be desirable to have a biofilm that corrects the weaknesses of the chitosan film. Therefore, there is a need for a biopolymer film with improved proprieties, including but not limited to improved tensile properties, water vapor barrier properties, antimicrobial, thermal, barrier and structural properties, non-toxic, edible, compostable and biodegradable.

Polymer blending is used to improve chemical and physical properties of films. The idea of using cellulose as reinforcement material in a thin film is now widely used for the packaging industry. There is a wide diversity of cellulose/CNC to provide reinforced thin films. CNC is used to reinforce polymers by hydrogen bonds forming with a matrix; incorporating CNC as a filler material in the polymer matrix improves tensile properties and water vapor barrier properties. It is also desirable to include additives in the biopolymer film to enhance certain properties and for aesthetic purposes, including the ability to print on the edible and biodegradable films.

Therefore, there is a need for an improved chitosan based thin film with the improved properties of CNC/ECNC. There is also a need for an improved chitosan based thin film with improved properties of CN/ECNC and certain additives that modify the performance of the biopolymer film.

SUMMARY OF THE INVENTION

A biopolymer film is provided comprising a combination of: Crystalline nanocellulose (CNC) and Esterified crystalline nanocellulose (ECNC); and chitosan.

Preferably, the amount of CNC used is between 40 to 50% wt. of the biopolymer film.

The two polymer components a) and b) can be in any ratio but an approximate 50 wt. % ratio is preferred.

The ECNC is preferably derived from a renewable agriculture based source. Such renewable agriculture base sources include cellulose plant based wood cellulose or sugar cane waste cellulose.

Chitin is preferably derived from exoskeletons of crustaceans, mainly from shrimp and crab shells. The amount of chitin is between about 60 wt % of the biopolymer film composition.

One embodiment relates to a biopolymer film comprising a combination of CNC/ECNC and chitosan and an additive. The additive includes at least one performance modifier additive between 40 to 50 wt. % wherein the additive provides improved antimicrobial activity to the biopolymer film.

In one or more embodiments the at least one additive is the performance modifier Ethylenediaminetetraacetic acid (EDTA). More specifically, the EDTA may be EDTA dianhydride (EDTAD) and the performance modification is improved antimicrobial activity.

Another embodiment relates to a biopolymer film comprising a combination of CNC/ECNC, chitosan and an additive, wherein the additive includes at least one of stearic acid or vanillin, and the additive is between 40-50 wt. % of the biopolymer film composition. In another embodiment, additional additives may be used depending upon the application and utility of the polymer films.

Another embodiment relates to a method of preparing biopolymer film. A Chitosan solution is mixed with CNC and ECNC are mixed to form a polymer blend. Another embodiment relates to a method whereby additives are added to the Chitosan/CNC/ECNC blend to form a thin biopolymer blend with improved properties. The biopolymer blend is extruded to form a biopolymer film.

Preferably the amount of polymer blend is a chitosan/CNC/ECNCPBAT ratio of 3:2:2. Further, the amount of chitosan used in the blend to form the packaging component is between 40 to 50% by weight of the biopolymer blend.

A method of preparing a biopolymer blend packaging component is also provided. A blend of CNC/ECNC is blended with chitosan to form a reinforced biopolymer blend. The biopolymer blend may be extruded to form a biofilm packaging component.

Preferably the amount of polymer blend in the method of preparing a packaging component is a chitosan, CNC, ECNC blend with a ratio of 3:2:2. Further, the amount of chitosan used in the blend to form the packaging component is between 60% by weight of the polymer blend that is useful to create thin biopolymer films and composites.

The invention also provides a biopolymer film that includes chitosan to create flexible films and packaging components and products that are also antimicrobial. An additional benefit of using chitosan is to utilize crustacean outer layers as an economic source of a biopolymer that also reduces bio-waste.

Also provided is a method of making thin biopolymer films and packaging components derived from a chitosan/ECNC/CNC blend that may include additives.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 includes scanning electron microscopy (SEM) micrographs of the three thin films at a magnification of 500×.

DETAILED DESCRIPTION OF THE INVENTION

Figure 1A:
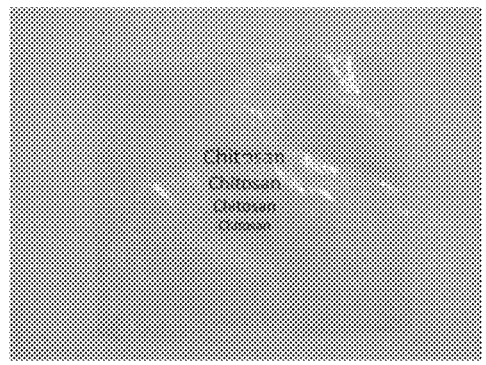
FIG. 1 illustrates examples of the films after drying, including FIG. 1A—the film composition is chitosan and PEG at a 3:1 ratio.
FIG. 1B—the film composition is chitosan, PEG and CNC at a 1.5:1:1 ratio, and FIG. 1C—the film composition is chitosan, PEG, ECNC (functionalized cellulose) at a 1.5:1:1 ratio.

The invention described herein relates to a biopolymer blend comprising a combination of Crystalline nanocellulose (CNC); Esterified crystalline nanocellulose (ECNC); and chitosan (CH).

This biopolymer blend has desirable characteristics, including improved tensile properties, water vapor barrier properties, antimicrobial, thermal, barrier and structural properties, non-toxic, edible, compostable and biodegradable. If using chitosan, CNC or ECNC alone, the biopolymer is brittle and lacks desirable mechanical properties. Additionally, chitosan creates a biofilm which also lacks the mechanical properties needed to create a durable biopolymer film. Therefore the biopolymer blend that is reinforced with chitosan results in a biopolymer blend composite with improved characteristics including increased tensile properties, water vapor barrier properties, antimicrobial properties, thermal resistant, improved water vapor barrier, as well as being non-toxic, edible, compostable and biodegradable.

Esterified cellulose nanocrystals and cellulose nanocrystals can be sourced from a wide variety of agricultural sources at minimal cost. Chitin/chitosan is readily sourced from a wide variety of crustacean and fungal sources, including shrimp and crab shells. In addition to being a plentiful and economic source of material, chitosan is also inexpensive to manufacture. Therefore, the combination of the inexpensive biopolymers with chitosan results in the production of economical biopolymer thin films or biopolymer composites that are biodegradable, compostable and edible. The resulting biopolymer thin films are also ideal for food packaging due to antimicrobial properties associated with chitosan.

The biopolymer blend may have three polymer components 1) crystalline nanocellulose (CNC) or esterified crystalline nanocellulose (ECNC); 2) PEG; and 3) chitosan, preferably in a 1.5:1:1 ratio. The ratio may range from 1.5:1:0.5 to 1.5:1:1.5. The amount of PEG can be increased or decreased depending on the flexibility of the film. Thus the amount of PEG may vary from 0.5 to 1.5 in the ratio. Thus the ratios may range from CNC or ECNC or mixtures thereof at 1.5: PEG at 0.5 to 1:5: chitosan at 0.5 to 1.5.

The amount of chitosan incorporated into the biopolymer blend is between 40 to 50% of the biopolymer blend. The preferred amount chitosan in the biopolymer may range from between 40-50%. A preferred amount of chitosan in the blend is 50% of weight for significant antimicrobial activity.

The biopolymer film may also comprise the combination of CNC/ECNC and chitosan and an additive. The additive includes at least one performance modifier additive between 50 to 75% wherein the additive provides improved antimicrobial activity to the biopolymer film. One preferred additive is EDTA, which is used to convert EDTAD. EDTAD is then used to convert CNC to ECNC, which is used as an antimicrobial agent.

The biopolymer film may also comprise the combination of CNC/ECNC and chitosan and additives that are performance modifier additives between 40-50 wt. %. The performance modifier additives may include at least one of stearic acid or vanillin. The preferred amount of stearic acid in the biopolymer may range from between 0.8-1%. The preferred amount of vanillin in the biopolymer may range from between 40 to 50 wt. %. A preferred amount of vanillin in the blend is 0.8% of weight.

The biopolymer film may also comprise the combination of CNC/ECNC and chitosan and additives that enhance the appearance of the biopolymer film, including novelty items, colorants, or additives that enhance film preparation techniques, including thermal heat printing.

Biopolymer Blending

In order to enhance the biopolymer, blending can be carried out with chitosan and CNC/ECNC blend using conventionally accepted processing methods. Additives are mixed with the biopolymer blends to ensure homogenous distribution of the additives throughout the biopolymer components using standard mixing methods as described herein and precipitated and vacuum filtered.

Roll to Roll Large Scale Fabrication for CNC Nanocomposite Films

Traditional laboratory scale processing techniques are challenging for large scale production, thus limits CNC based polymer product for the industrial application. Moreover, drying rate for CNC nanocomposite is too high (several hours to several days), which is another limitation for large scale manufacturing.

Polymer extrusion is the most widely used and is a readily available technique for large scale industrial production, where polymers have a melting temperature. CNCs, however, are biopolymers without a prominent melting temperature, which limits its processing using polymer extrusion. Therefore, CNCs solution casting is a preferred technique for its fabrication method. Further, CNCs as filler in a polymer matrix can be manufactured using extrusion based manufacturing techniques.

In one embodiment of this invention, Roll to Roll (R2R) is a method used for large scale production of the CNC nanocomposite compositions and films. This technique is applicable for both polymer melts and polymer solutions. Most importantly, this fabrication process has a large heating unit that can cure any polymer instantly, thus avoiding any delay due to drying. Further, this process is a true continuous manufacturing process that can provide large scale industrial production of any solution based polymer system.

Figure 18:
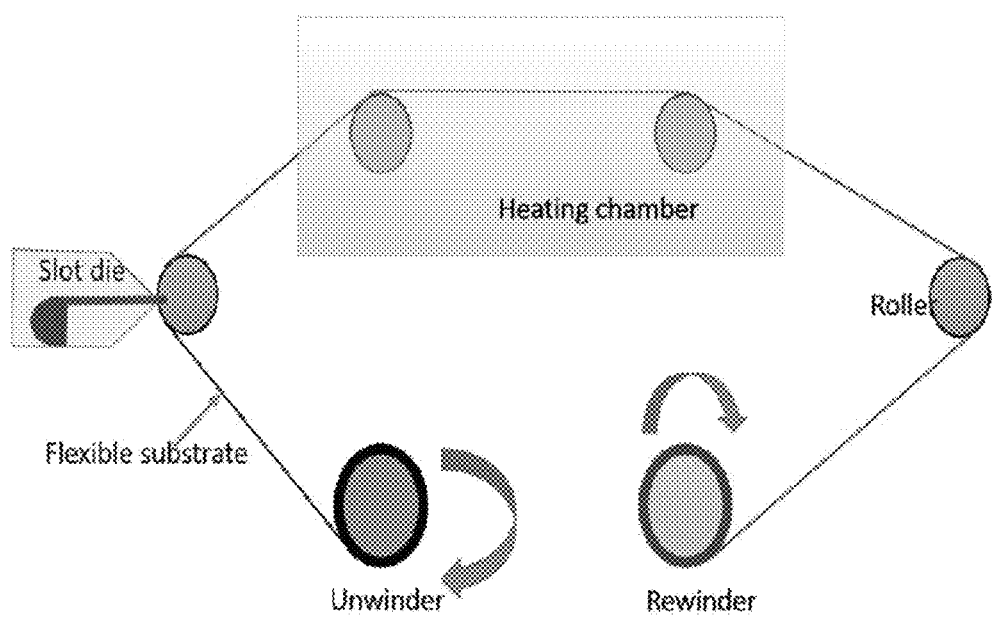
FIG. 18 provides a diagram of one embodiment of a fabrication method of thin film using a roll to roll continuous coating.

Roll to roll processing unit consists of slot die/gravure, an ink bath and a drying unit (heater, IR or UV unit based on polymer system). The overall process is performed continuously, and a flexible substrate like PET is used as shown in FIG. 18. In one aspect, a flexible substrate is in roller form and the substrate is moved from an unwinder to another roller where polymer solution or melt is deposited on the substrate, as illustrated in FIG. 18. In the next step, flexible PET with liquid polymer moves through the drying unit and the polymer is cured instantly. Further, polymer with a flexible substrate is collected in reminder. Selection of the slot dies VS gravure is determined by the polymer solution. In general, a low viscous polymer is preferred for gravure system, where slot die system is for high viscous polymer melt/solution.

Experiments

The various experiments described herein illustrate the compositions and production of reinforced biopolymer thin films. These experiments also provide support for the effectiveness of chitosan to reinforce crystalline nano cellulose/esterified crystalline nanocellulose (ECNC) biodegradable films on the thermal and tensile properties of the biopolymer thin films and components. Further, these experiments demonstrate an improved antimicrobial and biodegradability characteristics of these thin biofilms, which results in a positive environmental impact.

Materials

Cellulose nanocrystals (CNC) in dry form (90-100%) produced by the University of Maine at process development center. Microcrystalline cellulose (MC) from CreaFill Fibers Corp. (Chestertown, Md.—USA), Chitin from shrimp shell, Poly(ethylene glycol) (PEG-Average Mn 400), stearic acid (Grade I, 98.5%; Capillary GC), vanillin 99%, sodium hydroxide (ACS reagent, 97%, pellets), ethylenediaminetetra acetic acid (EDTA); BioUltra, anhydrous 99%, acetic anhydride (ACS reagent, 98%), pyridine; (anhydrous, 99.8%), N,N-dimethylformamide (DMF); (anhydrous, 99.8%), acetic acid (ACS reagent, 99.7%), ethanol and acetone. All chemicals were purchased from Sigma-Aldrich (Saint Louis, Mo.—USA).

Chitin to Chitosan Conversion (Deacetylation)

Conversion of chitosan was achieved by the deacetylation of chitin. The reaction was performed at room temperature for 72 h with continuous magnetic stirring to confirm homogeneous reaction using 70% NaOH with a chitin to base solvent ratio of 1:14 (w/v). The resulted chitosan was separated through filtration by cotton cloth and washed with distilled water several times to remove the base. Then it was dried at room temperature and kept in desiccator.

Esterification of Cellulose Nanocrystals (CNC) 2.3.1—Synthesis of EDTA Dianhydride (EDTAD)

To synthesize EDTAD, at first 18 g of EDTA was mixed with 31 ml of anhydrous pyridine, and then 24 ml of acetic anhydride was added to the mixture. The temperature of the mixture was fixed at 65° C. for 24 h with stirring. At the end of the reaction, solid EDTAD was obtained and was washed with acetic anhydride and diethyl ether. The product was dried under vacuum and left to cool in a desiccator.

Synthesis of Esterified Cellulose Nanocrystals (ECNC)

The prepared EDTAD was used to functionalize ester with CNC. Esterification reaction was conducted by the treatment of 15 g CNC and about 30 g EDTAD in 500 ml of anhydrous DMF. The reaction mixture was stirred continuously for 20 h at 75° C. in order to obtain ECNC. The resulted ECNC was washed with DMF, 10% Na2CO3, deionized water and then followed by ethanol, acetone to remove if any unreacted parts remain. To make it try kept inside oven at 80° C. for 1 h and then stored in a desiccator.

Preparation of Thin Films

Chitosan solution was prepared by mixing 1.5 g of chitosan with 100 mL of 1% acetic acid solution. Once the chitosan solution was appeared as a viscous liquid, then 0.5 g of PEG 400 was added as a plasticizer under constant stirring. The chitosan solution was degassed under vacuum chamber and then cast on a plastic plate and then placed inside the oven at 40° C. for 2 days. The dried film was peeled off from the plate and stored in the film desiccator.

Preparation of Cellulose (MC/MMC/CNC/ECNC) Reinforced Chitosan Thin Films

Figure 1B:
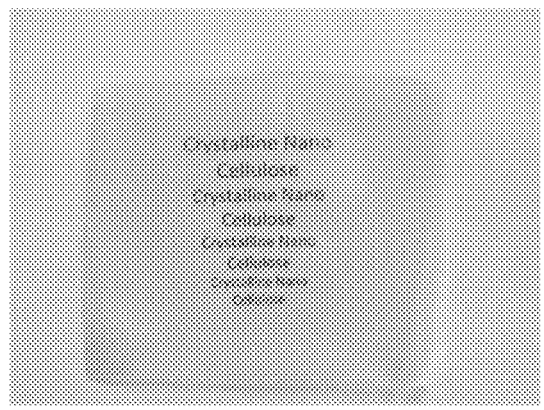
Figure 1C:

The other four thin films were prepared using different cellulose derivatives by reinforced them separately into chitosan matrix in a same way followed by the Sangsuwan et. al.'s method with modification. In this process, 1.5 g of chitosan was dissolved in 1% aqueous acetic acid solution and 1 g of cellulose (CNC/ECNC) was dissolved in 50% ethanol solution. Both mixtures were magnetically stirred continuously for 3 hours and then mixed together in a beaker, and 1 g of PEG 400 was added as a plasticizer into the solution. Then the film forming solution was heated at 75° C. under constant stirring. To improve the water barrier properties, 0.008 g of stearic acid was added. Then 0.9 g vanillin was added, and the temperature of the solution was increased up to 85° C. to melt vanillin. For homogenous mixing of chitosan and cellulose ultra-sonication was applied to the solution for 5 min using "Sonics Vibra-cell" (Sonics & Materials Inc., USA) with amplitude of 55. After sonication, the solution was filtered through the Buckner funnel to remove the undissolved part. Then the solution was placed inside the vacuum chamber to remove air bubbles. Finally, the film forming solution was poured on the plastic plate, and the plate was placed over the uniform flat surface. Then the plate was heated for solvent evaporation at 40° C. for 2 days. Dried films were peeled off and stored in a film desiccator. Appearance of thin films after being dried was showed in FIG. 1.

Characterization of the Intermediates and Thin Films

Fourier Transform Infrared (FTIR)

Conversion of chitosan, degree of deacetylation of chitosan, mercerization of MC and synthesis of ECNC were characterized by the FTIR spectroscopy. For thin film, the interaction between filler material and matrix was observed and compared to the other films. The FTIR spectra for the solid samples and films were recorded within the range of 400-4000 cm-1. A total of 64 scans were performed at 4 cm-1 resolution. Before FTIR analysis films were stored in film desiccator for 72 h to make free from moisture. FTIR analysis was conducted using Shimadzu FTIR prestige 21.

X ray Diffraction (XRD)

XRD analysis was performed for the cellulose samples and as well for thin films. In a case of films, samples were folded two/three times to increase the thickness. Samples were analyzed using Rigaku DMAX X-ray diffractometer with Cu Kα radiation at 40 kV and 30 mA. Scans were measured with step increment 2θ=5°/min between 2θ=5-50°.

Tensile Test

Tensile modulus, ultimate strength and elongation at break were measured using MTS 809 Axial/Torsional Test System machine. Thin films were cut according to the ASTM D882 standard. Each film was cut into 70 mm×10 mm rectangular strip, and the grip separation was 50 mm. Film thickness were ranged between 10-50 µm and was measured by the optical microscopy. Five replicates were tested for each film. The cross-head speed was set at 0.01 mm/s and 20 N load cell.

Scanning Electron Microscopy (SEM)

Surface morphology of thin films and size, shape distribution of CNC, ECNC were observed using JEOL JSM-6400 scanning electron microscope (SEM) at 10 kV accelerating voltage. Gold sputtering was performed over the surface of the sample before taking image by SEM.

Gel Swelling Property

For this test each sample was cut into 20.0 mm2 square shape no of replicates was three. At first all the samples were placed in an oven at 35° C. for 12 h, and their weight were taken accurately. Then dried samples were immersed in water containing beaker covered with parafilm and stored at room temperature for 12 days. Every four-day interval wet samples weights were recorded before water was absorbed by blotting paper to remove the surface water of film. Swelling property of the film was measured by the following equation:

$$S=[W_s-W_d/W_d]\times 100$$

Where, S represents the percentage of water absorbed by the film at equilibrium condition. Ws and Wd are stands for weight (in g) of the film at swollen and dry state respectively.

Thermogravimetric Analysis (TGA)

TGA analysis was performed for the investigation of thermal stability for thin films using thermogravimetric analysis Q-500 from TA Instruments Inc. (DE). Sample weight was maintained between 10-15 mg and placed on the platinum plate. The temperature range was set from room temperature to 600° C. with scan speed 10° C./min. Samples were run under nitrogen environment with a purge flow rate of 60 mL/min.

Antimicrobial Test

Antimicrobial activities of chitosan-blended films were tested qualitatively by agar spread plate method. Triplicate tests were performed for these experiments on three separate runs on *Salmonella Typhimurium* (incubation at 37° C. for 24 h), *Yersinia enterocolitica, Listeria monocytogenes* and *Pseudomonas fluorescens* (at 30° C. for 24 h). To assess the antimicrobial activity of the CCN and CECN films, bacterial isolates were streaked onto MH agar plates and incubated at appropriate temperatures to obtain single colonies. Two to three isolated colonies were transferred from each plate into tubes containing 3 mL of TSB using sterile disposable loops. The bacterial suspensions were mixed using a vortex mixer and incubated at 37° C. on a shaker at 225 rpm for 3 h. Sterile TSB was used to adjust the turbidity of the bacterial suspensions in order to obtain a turbidity approximately equal to that of a 0.5 McFarland Standard (approximately $1-2\times 10^8$ cfu/ml for *Escherichia coli* ATCC 25922). The optical density of each bacterial suspension was measured at 600 nm (OD600) using a UV-VIS spectrophotometer (Nanodrop 2000, Wilmington, Del., USA). The starting bacterial concentrations measured at OD600 were 0.097 for *Salmonella Typhimurium*, 0.103 for *Yersinia enterocolitica*, 0.109 for *Listeria monocytogenes* and 0.111 for *Pseudomonas fluorescens*.

One hundred microliters (0.1 mL) of the bacterial suspension from diluted suspensions ($10^{-2}$-$10^{-6}$) was inoculated onto MH agar plates and spread evenly using disposable sterile spreaders, allowed plates to air-dry in a hood. Thereafter, the films (1-1.5 cm2) were placed on the agar surface and incubated at appropriate temperatures for 24 h. In order to assess the whether the antimicrobial activity of these films is due to bacteriostatic or bactericidal, the CCN and CECN films were tested at different inoculated agar surface contact time intervals; 2 h, 4 h and 6 h. Briefly, 10 µL of cell suspensions containing approximately $10^4$-$10^5$ cfu/ml were placed at the center of agar plates and allowed to air-dry in a hood. Films were then placed directly on the surface of agar where the inoculum was added and the plates were incubated at appropriate temperatures. After 2 h the films were carefully removed with sterile forceps and discarded and the plates were visually observed without a magnifying glass and re-incubated for a total of 24 h. This procedure was repeated for the plates set up for observation after 4 h and 6 h of incubation. Control plates were inoculated with sterile TSB and growth control plates were inoculated with the four isolates.

Experimentation Results

Conversion of Chitosan

Figure 2:
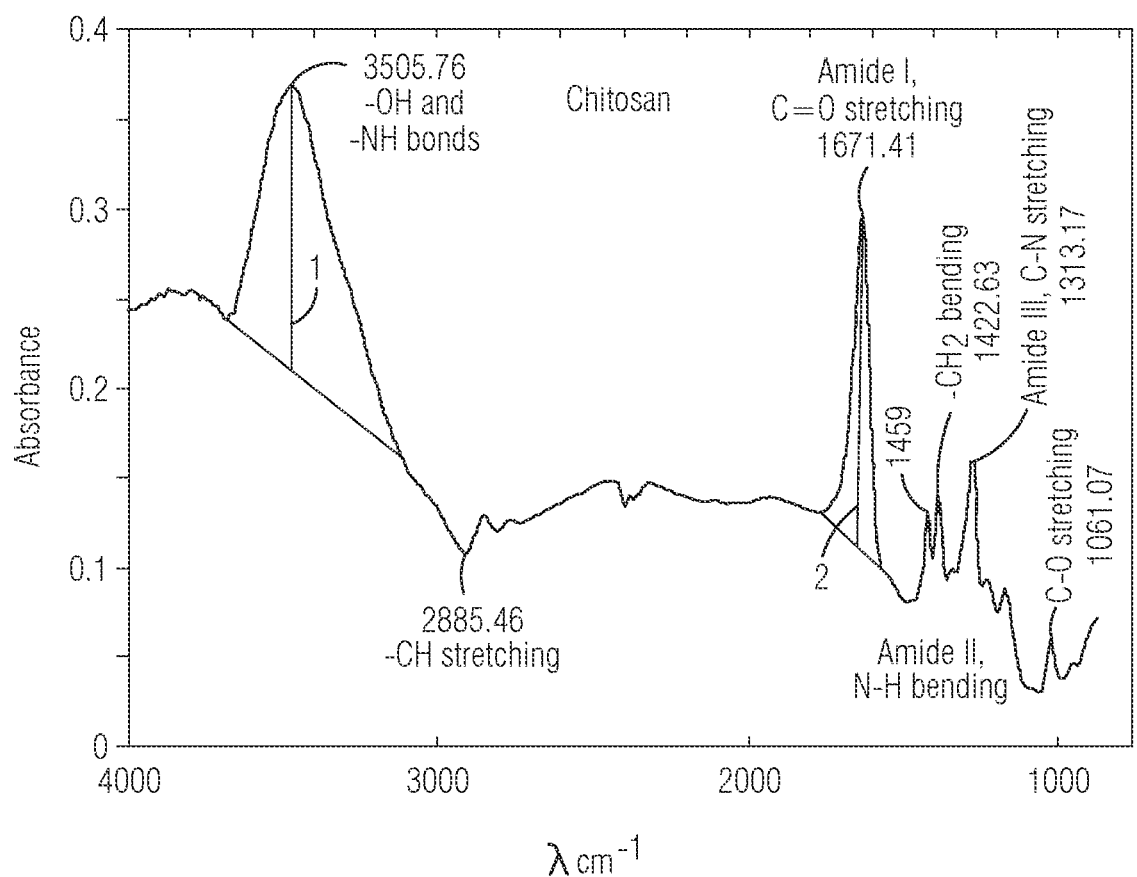
FIG. 2 illustrates the Fourier transform infrared spectroscopy (FTIR) spectrum of chitosan.

In the FTIR spectrum of chitosan (FIG. 2), the broad peak centered at 3505 cm-1 was attributed to stretching vibration of the —OH and —NH bonds in chitosan. The broad region from (3200-3600 cm-1) was corresponding mainly intra and intermolecular O—H and —CH2OH vibrations overlapped with —NH$_2$ primary and —NH secondary amides stretching vibrations. Characteristic peaks at (2800-2900 cm-1) were responsible for —CH symmetric and asymmetric modes of stretching vibrations. The peak at 1422 cm-1 was attributed due to the —CH$_2$ bending. A sharp band at 1671 cm-1 was observed for amide I due to the C=O stretching vibration of primary amide bonds. Amide II and amide III vibrational modes were also been observed at 1459 and 1313 cm-1 respectively for N—H bending and C—N stretching vibrations of the amide group. Another peak was observed at 1061 cm-1 for C—O stretching of the acetyl group in chitosan. Chitosan is an N-derivative of chitin and derived by the partial deacetylation from chitin. The rate of removal acetyl group from chitin is mainly referred as degree of deacetylation (DD). Chitosan DD is considered as an important parameter to determine the property of chitosan, such as chemical reactivity, solubility and biodegradability. DD of chitosan can be controlled by alkali treatment with changing time and temperature. To obtain higher DD time and temperature need to be increased during processing with alkali. There are several methods to determine DD of chitosan, such as different methods of titration and various methods of spectroscopy (UV/Vis, FTIR and 1H NMR). In this work, we used FTIR spectroscopy method for the determination of DD. Some equations are already established to calculate DD by FTIR method. These equations are mainly based on absorption ratio of several spectral bands. The most widely used equation was used here and was calculated from the following relation:

$$DD(\%)=[A1671/A3505\times 100]/1.33 \qquad (1)[17]$$

Where $A_{3505}$ and $A_{1671}$ were representing the values of absorbance from the baseline 1 and 2 respectively (FIG. 2). From the FTIR spectra in FIG. 2, absolute heights for 3505 and 1671 cm-1 band from baseline (1 and 2) were measured. The values were obtained 0.17 and 0.19 for A3505 and A1671 respectively. By applying these values in equation (1), DD of the prepared chitosan was 84%. It is very rare to achieve 100% of DD. Most of the commercial chitosan has DD in the range of 75-85%.

Characterization of Esterified Crystalline Nano Cellulose (ECNC)

Figure 3:
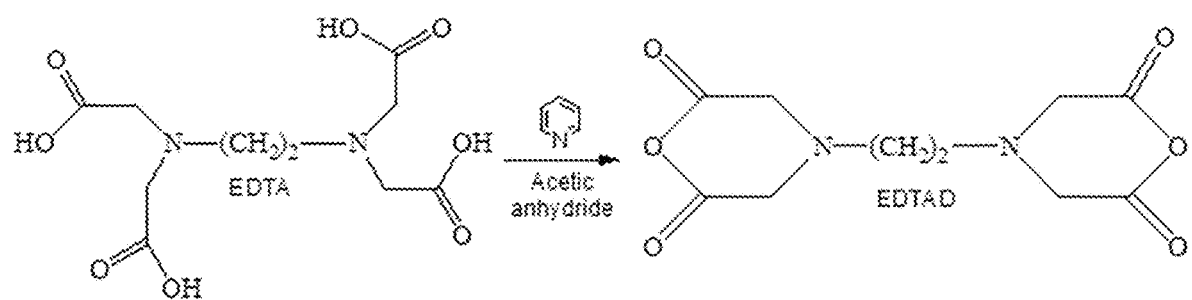
FIG. 3 illustrates the synthesis of ethylenediaminetetra acetic acid dianhydride (EDTAD).
Figure 4:
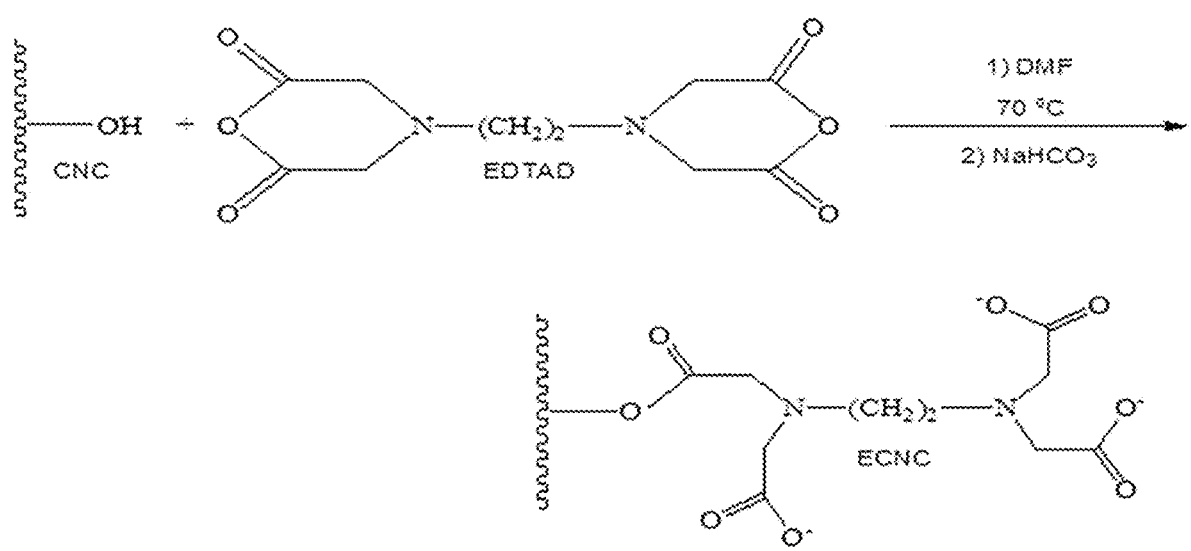
FIG. 4 provides the reaction mechanism of esterified crystalline nano cellulose (ECNC).

The selective esterification reaction of CNC was achieved via the reaction between the hydroxyl groups of CNC and the anhydride group present in ethylenediaminetetra acetic acid dianhydride (EDTAD) (FIG. 4). To prepare EDTAD, ethylenediaminetetra acetic acid (EDTA) was chemically modified using pyridine and acetic anhydride (FIG. 3). EDTA is widely available and powerful chelating agent. It is hexa-dentate ligand and contains four carboxylates and two amine groups. EDTAD is also a very active agent can easily react with the cellulose because of the anhydride group present in the molecule.

Figure 5:
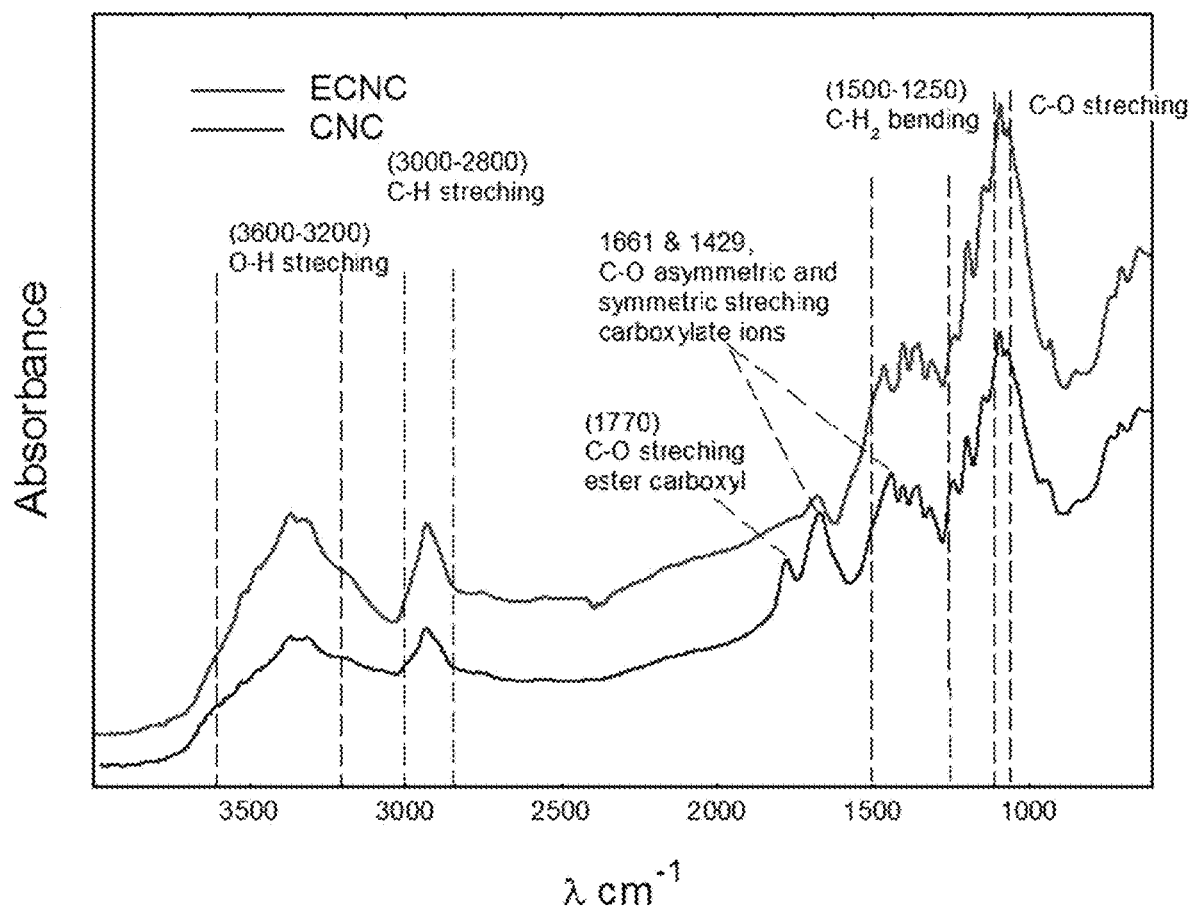
FIG. 5 provides FTIR analysis of ECNC.

The synthesized ECNC was confirmed by the FTIR analysis (FIG. 5) and was compared with the pure CNC. In the FTIR spectra of ECNC and CNC, the broad absorption peak from 3600 to 3200 $cm^{-1}$ was assigned to the O—H stretching vibration. The band at (3000-2800 $cm^{-1}$) was caused by the C—H stretching and the band at (1500-1250 $cm^{-1}$) was originated due to the $CH_2$ bending. Due to the C—O stretching at C-3 position of CNC a sharp peak was observed at (1030-1060 $cm^{-1}$). In the case of ECNC, three new characteristic peaks were observed at 1770, 1661 and 1429 $cm^{-1}$. The band at 1770 $cm^{-1}$ was attributed due to the C—O stretching vibration of the ester carboxyl group. Peaks at 1661 and 1429 $cm^{-1}$ were responsible for the C—O asymmetric and symmetric stretching of carboxylate ions.

FTIR Analysis of Thin Films

Figure 6:
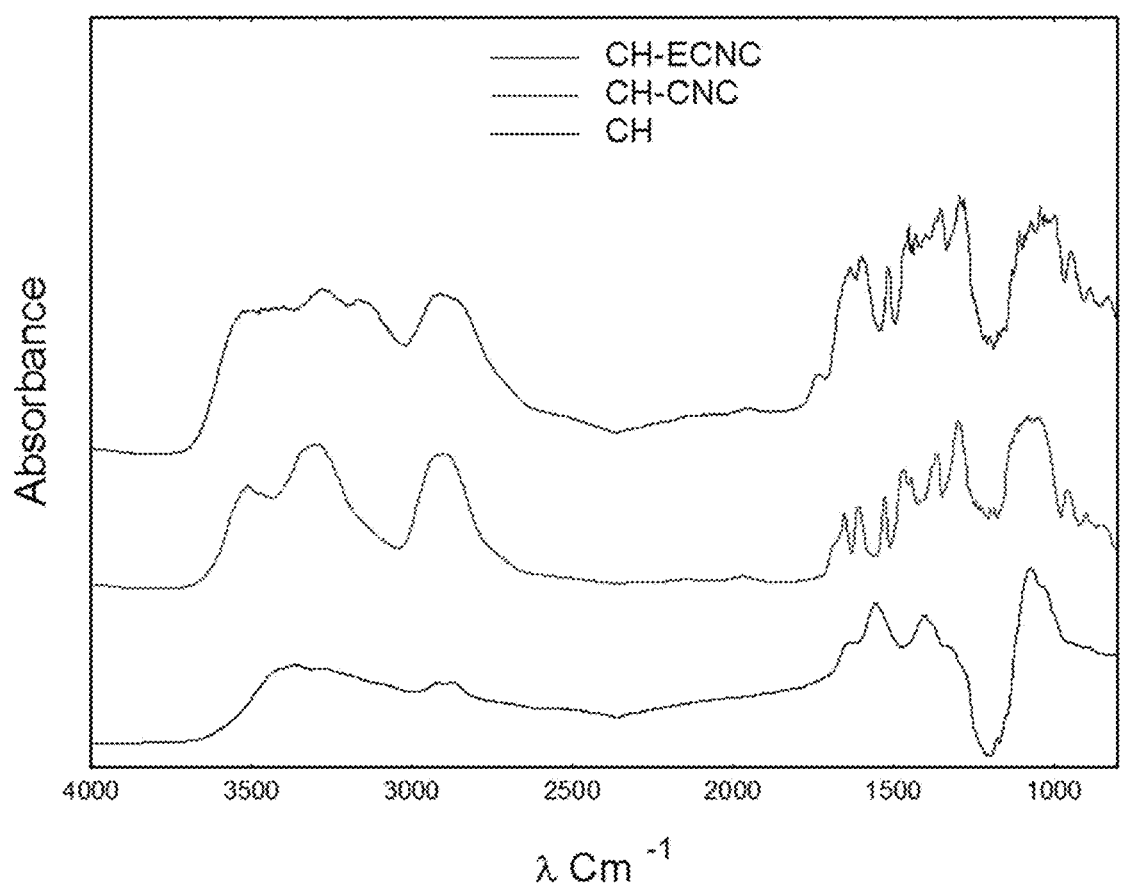
FIG. 6 illustrates FTIR spectra of three thin films, including CH, CH-ECNC, and CH-CNC.
Figure 7:
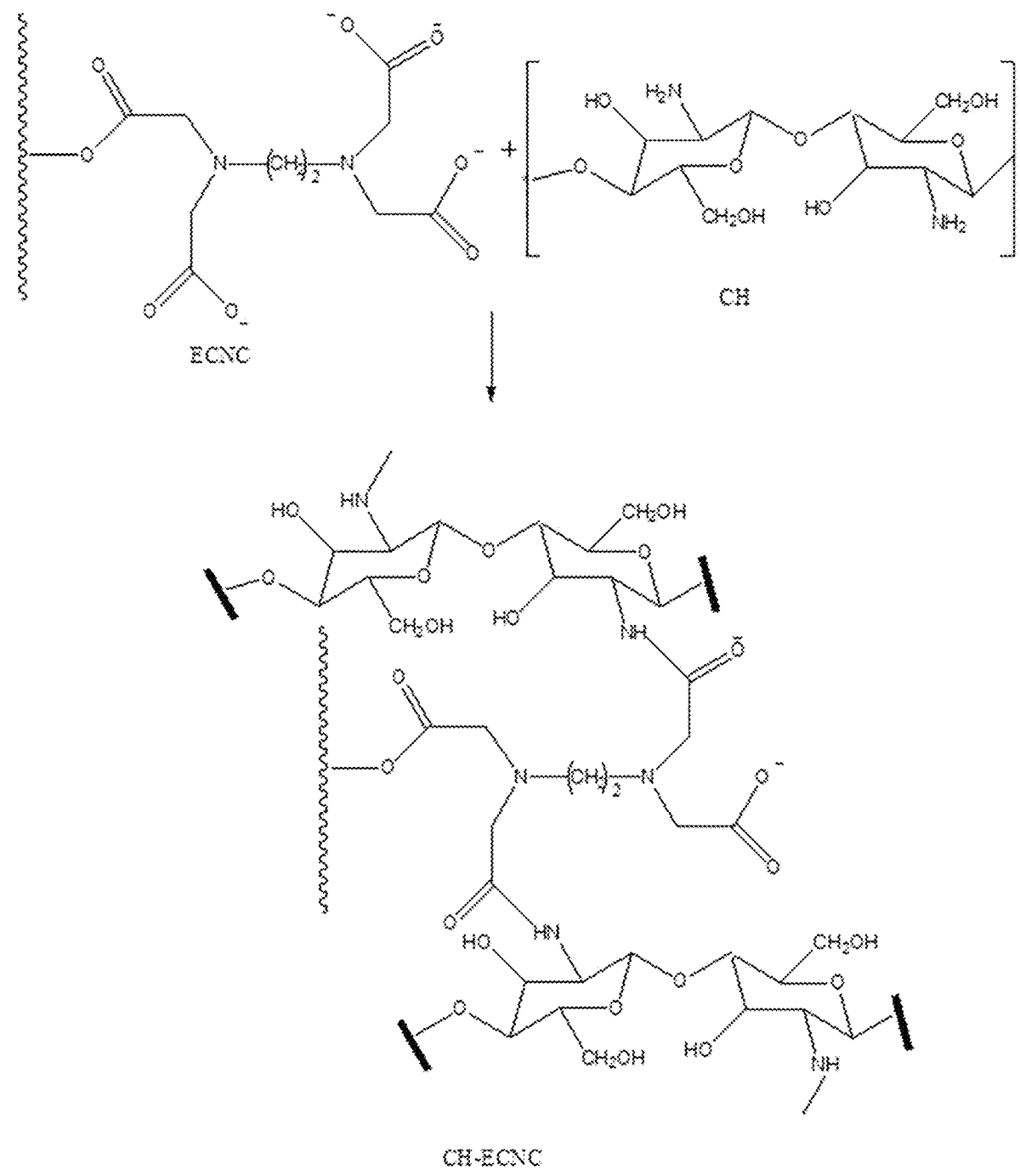
FIG. 7 provides the interaction of chitosan on the surface of esterified crystalline nano cellulose containing terminal carboxylate ion.

FTIR spectra were used to determine the interaction between chitosan and cellulose due to the polymer blending. In this case blending of polymers influenced a strong interaction between functional groups present in chitosan and cellulose via hydrogen bonds. Few changes were observed due to the addition of CNC and ECNC into chitosan matrix respectively, which was not observed in control chitosan film. From FIG. 6, sharp broad bands 3200-3600 $cm^{-1}$ with high intensity were observed after incorporating cellulose into chitosan matrix. A drastic increase of peak intensity also found at 2900 cm-1 for CH-CNC and CH-ECNC films. Such changes were not noticed in CH film, and that indicated the formation of hydrogen bonds between cellulose and chitosan. The characteristic peaks present in chitosan film also observed in CH-CNC film except for the peak attributed at 1590 $cm^{-1}$ (CH film) and that peak was assigned for —NH bending of amide group present in chitosan structure. The disappearance of —NH bending peak in other films signified the involvement of NH bond of the amide group with the functional groups of cellulose due to the polymer blending and leading towards perfect miscible film. In CH-CNC film observed that the peak was shifted to a higher frequency and overlap with the characteristic peak for C=O stretching at 1670 $cm^{-1}$. Other bands at 1340 and 1050 $cm^{-1}$ showed higher intensity after addition of cellulose. In the case of CH-ECNC film, esterified CNC was used, and the hydroxyl group of cellulose was replaced by the ester group. This film exhibited few exceptions that were not detected in CH-CNC film. A significant change was observed for the absorption band centered at 1650 $cm^{-1}$ with higher intensity due to the C=O stretching vibration of amide I group. Another significant variation was noticed at 1770 $cm^{-1}$ corresponding to C—O stretching vibration of the ester carboxyl group. The presence of these two peaks inferred the reaction between the amino groups of chitosan with the carboxylate ion present in ester groups of functionalized CNC. From the data obtained by the FTIR analysis, a most probable reaction was assumed between chitosan and esterified CNC (FIG. 7). Chemical bond formation between amino groups of chitosan with the carboxylate ester of ECNC is highly predictable to take place. Some difficulties are expected in the suggested reaction due to the steric hindrance that can block the active sites of the polymer to form a linkage. Thus at the end of the reaction, a significant number of the chitosan chain are remained unreacted in the final nanocomposite.

X-Ray Diffractograms Analysis of Thin Films

Figure 8:
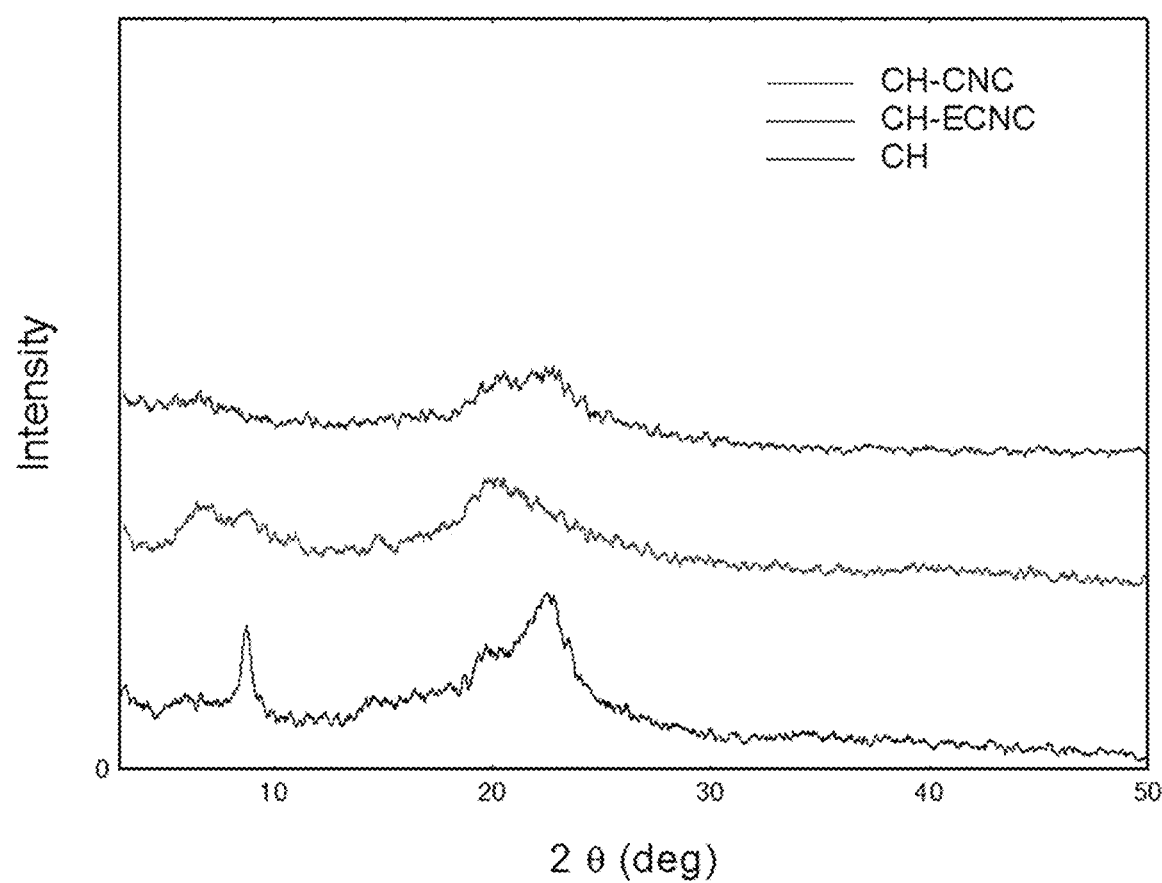
FIG. 8 includes XRD diffractograms of three thin films, including films of neat chitosan (CH), CH-ECNC, CH-CNC.

X-ray diffractograms of different films, CH, CH-CNC and CH-ECNC were presented in FIG. 8. Different literature has been reported the characteristic peaks showed up for chitosan and cellulose. Qi and XU et al. found two characteristic peaks in the diffractogram of chitosan at 2θ=10.4o and 21.8o and Stefanescu et al. reported that two major peaks were found at the 2θ angle of 10.7o and 19.80. Stefanescu et al. also found XRD pattern for pure cellulose powder at 2θ=14.90 and 23.

The diffractogram of pure CH film exhibited two peaks at 2θ=9.8o and 23.4o (FIG. 8) and which is close enough to the solid chitosan powder. Slightly peak shifting was observed in chitosan film. That could be the reason for using acetic acid solvent and PEG as plasticizer. By incorporating CNC and ECNC into chitosan respectively, only one peak was observed at 2θ angles around 23o with decreased intensity. While in pure cellulose one peak usually detected at 2θ~150 but in CH-CNC and CH-ECNC films that peak was not found. There was no sharp peak found at 2θ=9.8o except in CH film. The disappearance of one peak and the presence of only one prominent peak signify that the polymer blending of chitosan and cellulose influenced each other. Due to the polymer mixture resulted films became amorphous and overcame the crystalline peaks that were present in individual polymers. The disappearance of crystalline peaks in CH-CNC and CH-ECNC films could be explained due to the formation of hydrogen bonding between cellulose and chitosan. That indicates the resulted films are highly miscible and properly dispersed into the matrix. In nanocomposite, if the blending of polymers is successful then it is hard to arrange an order in the crystal lattice.

Mechanical Performance of Thin Films

Figure 9:
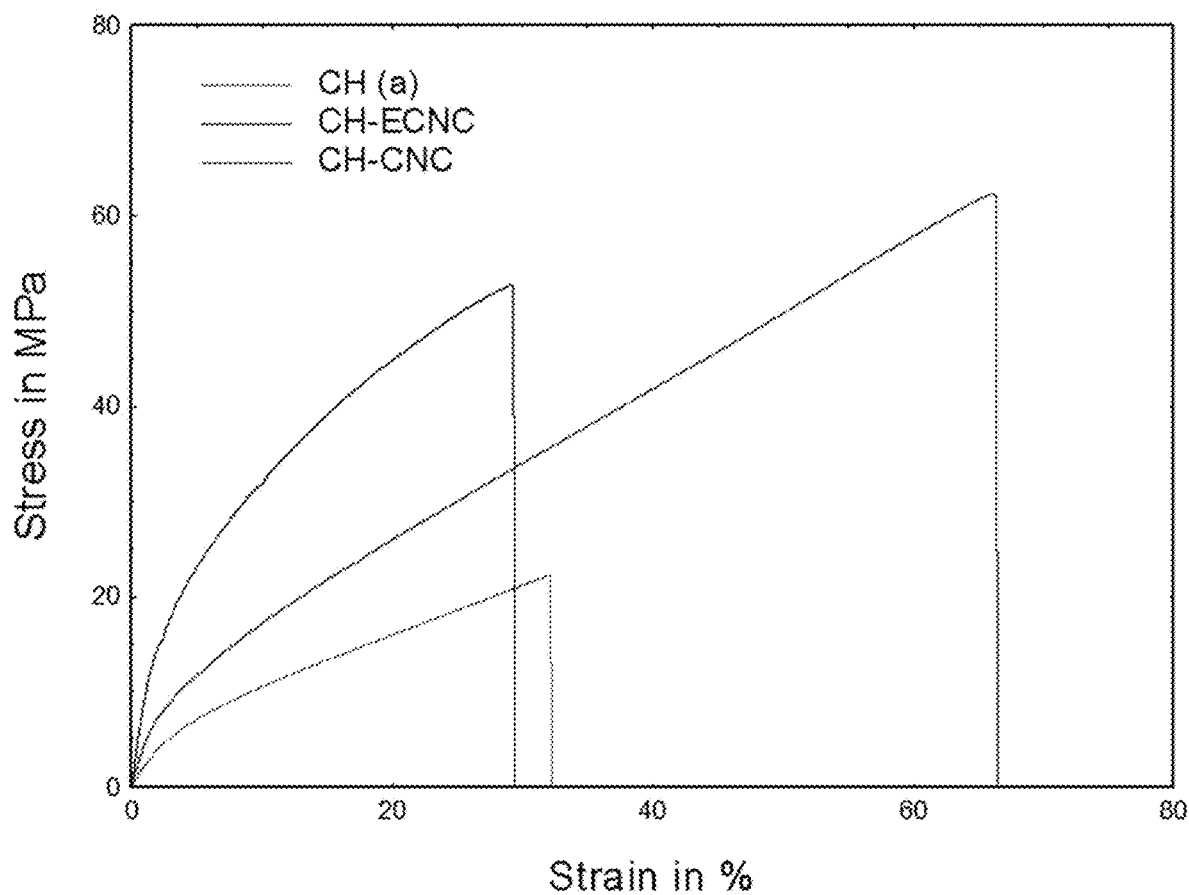
FIG. 9 provides stress-strain curves of three thin films, including neat chitosan, and cellulose derivatives reinforced into chitosan composite films (CH-ECNC).
Figure 10:
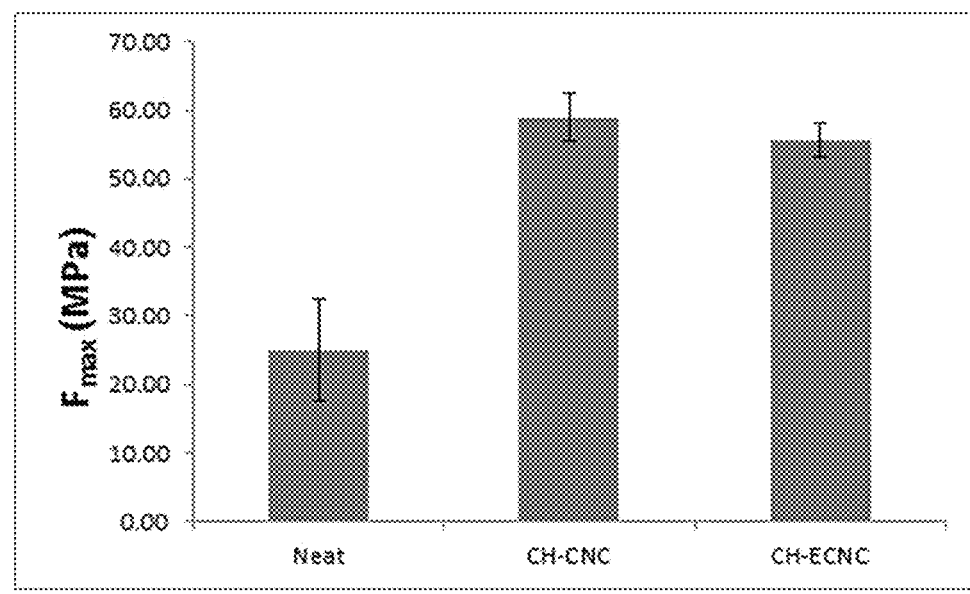
FIG. 10 illustrates tensile strength of three thin films, including films including films of neat chitosan (CH), CH-ECNC, CH-CNC.
Figure 11:
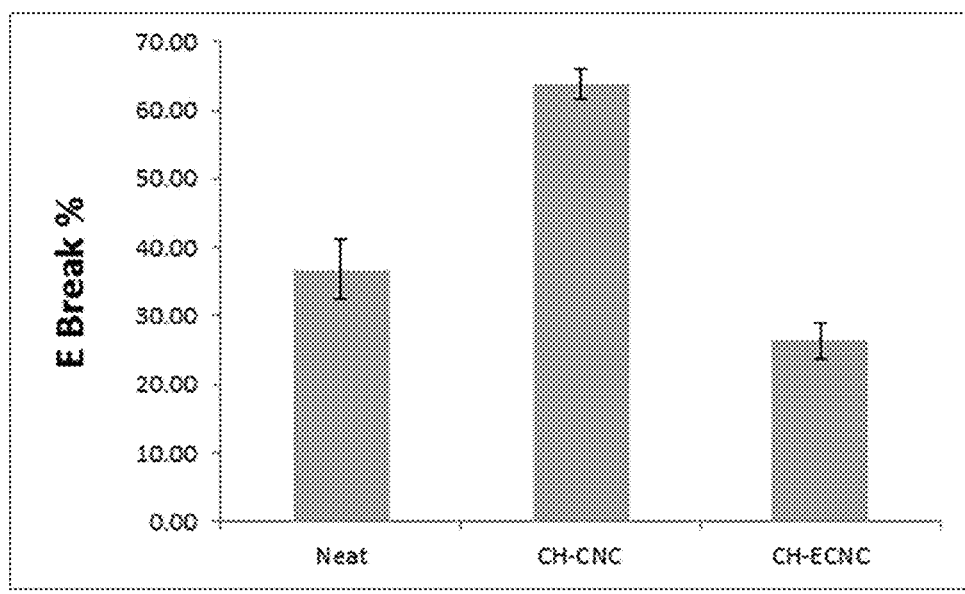
FIG. 11 provides the differences of the elongation at break in percentages of the three thin films.
Figure 12:
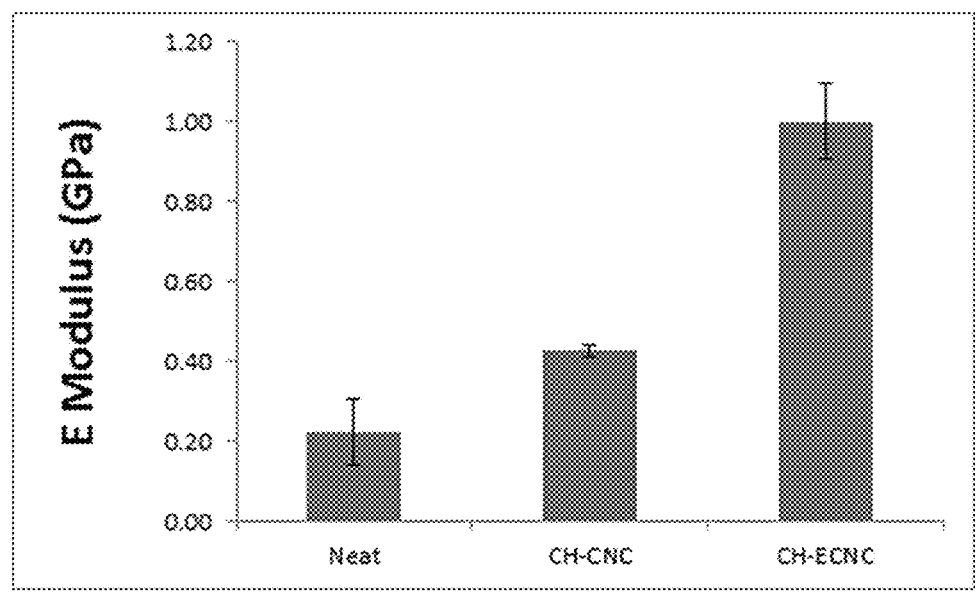
FIG. 12 illustrates the tensile modulus of the three thin films.

Thin films used in food packaging industries should have resist quality for stress upon shipping, handling and storage. Tensile test was performed to observe the effect after incorporating different types of cellulose (CNC and ECNC) into chitosan matrix. Tensile strength (TS), tensile modulus (TM) and elongation at break (EB) were determined from the stress-strain curve (FIG. 9), and the results of TM, TS and EB were depicted in FIGS. 10, 11 and 12 respectively. The small difference in film thickness among films and moister content may affect the mechanical performance results on the comparative study of five different types of films. The tensile strength of pure chitosan film was found to be 25.0 Mpa and the reinforced films by the addition of CNC and ECNC (2:3 weight ratios with the chitosan matrix) enhanced the TS value up 58.9 and 55.6 Mpa respectively. The improvements of TS were 135% (CH-CNC film) and 122% (CH-ECNC film) compare to the control CH film (FIG. 11). This enhancement could be attributed due to the good interfacial interaction between cellulose and chitosan and both polymers have the similar structure. The highest improvement observed for CH-CNC film was 135%. According to Khan et al., there are mainly two important factors that may increase the TS after incorporating CNC. One is the nanocrystal-polymer interaction, and the other is the effective stress transfer at the nanocrystal-polymer interface due to the reinforcing effect of CNC. CNC obtained by the acid hydrolysis synthesis using sulfuric acid, and the resulted nanocellulose contain anionic sulfate ions that easily interact with the cationic amino groups present in the chitosan structure. That preferred an active interaction between filler and matrix. Nano cellulose reinforced films showed better TS because of the uniform stress distribution by load transfer onto the nanocrystal network and also reduce the stress concentration area. The EB value (FIG. 12) increased up to 74% for CH-CNC film compare to the control CH film, but CH-ECNC film decreased by 28%. From FIG. 12, it was observed that the CH-ECNC film showed the highest TM value and that is moderately very high than other films. It showed brittle nature with high stiffness property. Due to the addition of ECNC into chitosan matrix, the active anionic, and bulky carboxyl ester groups strongly interact with the amino groups and block all over the chitosan matrix interface and also leads to restricting the motion of matrix resulting in a reduced EB value. Tensile response of different films was given in table 3.1.

TABLE 3.1

Tensile response of thin films

| Specimen | Tensile Strength (TS) Mpa | Tensile Modulas (TM) Gpa | Elongation at break (EB) % |
| --- | --- | --- | --- |
| Neat – CH (a) | 25.04 ± 7.47 | 0.22 ± 0.08 | 36.75 ± 4.35 |
| CH + CNC (d) | 58.91 ± 3.49 | 0.43 ± 0.02 | 63.77 ± 2.28 |
| CH + ECNC (e) | 55.57 ± 2.42 | 1.00 ± 0.10 | 26.35 ± 2.55 |

Surface Morphology of Thin Films

Figure 13A:
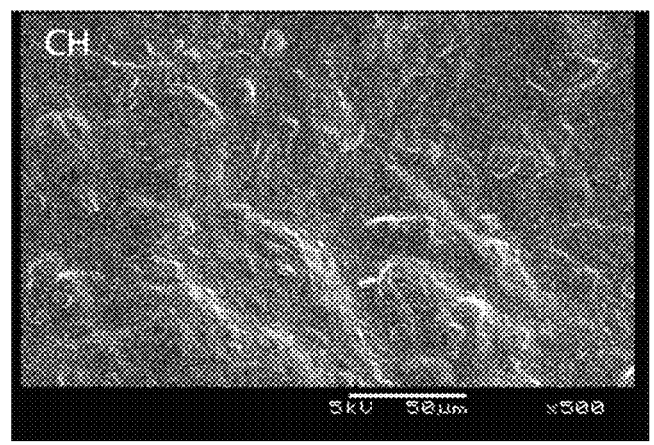
FIG. 13A is CH (chitosan "CH").
Figure 13B:
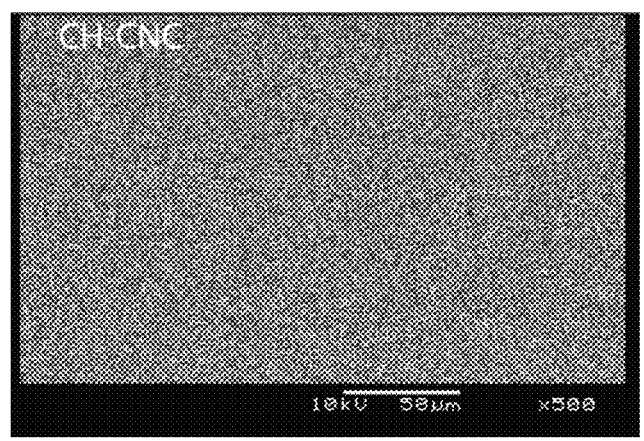
FIG. 13B is CH-CNC (Chitosan-Crystalline nanocellulose "CNC").
Figure 13C:
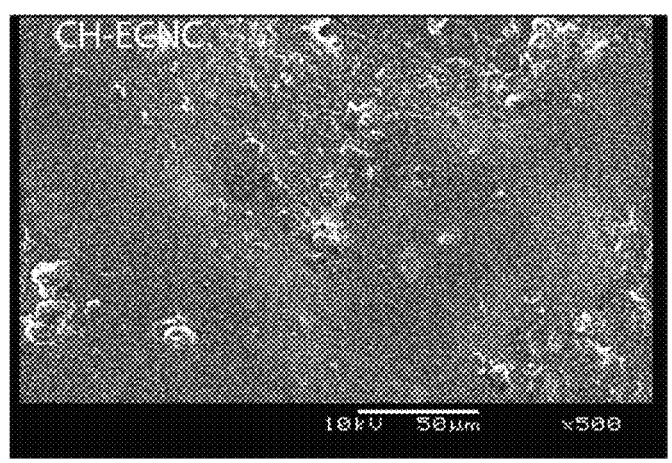
FIG. 13C is CH-ECNC (Chitosan-Esterified crystalline nanocellulose "ECNC").

Scanning electron microscopy (SEM) was performed to understand the surface morphology of the different films and to compare with each other. SEM images disclosed the miscibility between polymers, homogeneous dispersion of filler materials into matrix of the composite, presence voids and agglomerations. SEM images of the surface morphology of pure chitosan and different chitosan-cellulose composites were presented in FIG. 13. For SEM images, all the samples were magnified 500 times. The surface of neat CH film was found smooth with slightly coarse nature and was composed of interlayer orientation. The smoothness of neat film could be attributed due to the incomplete homogenization of chitosan in aqueous media with plasticizer. Chitosan forms highly viscous solution in aqueous media. Viscous film interrupts the water molecule to the faster vaporization. Hence, fewer voids and agglomerations observed. CH-CNC film showed a very smooth surface due to the addition of CNC and indicating a proper homogeneous dispersion into chitosan matrix. No baubles and roughness was observed. The reason behind of this smooth surface is a successful nanocrystal-polymer interaction in a perfect ratio. Due to the homogeneous and dense structure of CH-CNC film showed a very outstanding performance in mechanical test. However, the surface became rougher due to the addition of ECNC. In the case of CH-ECNC film, few cracks also observed over the surface. That could occur due to the agglomeration. The presence of excess ECNC could not interact with the matrix because of the steric hindrance of bulky groups.

Gel Swelling Property of Thin Films

Figure 14:
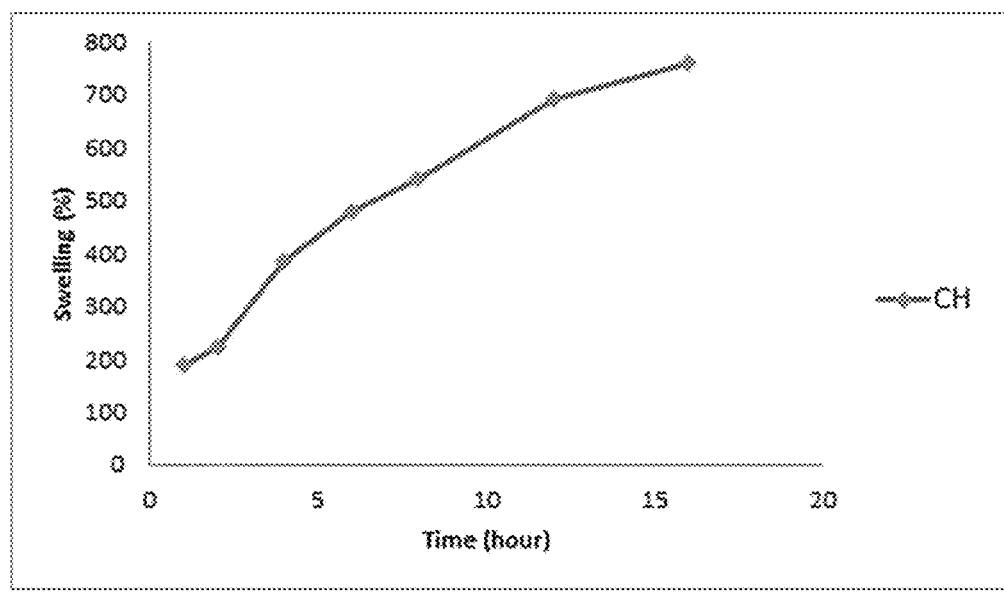
FIG. 14 illustrates the water uptake results, or gel swelling property, of pure chitosan film.

The gel swelling property of pure chitosan film was represented in FIG. 14. From the figure, it was observed that after 1 h the swelling percentage value (S) increased by 190%. And then every hour S value was gradually increased. After 16 hour, S value was monitored, and the water uptake percentage was 759%. This experiment was performed for 48 hours. At the end of the experiment swelling increased of neat film by 1744%. And then the film started to degrade. Chitosan usually insoluble in water but easily swell when exposed to water. Hence limits the application of such films in a moist environment.

Figure 15:
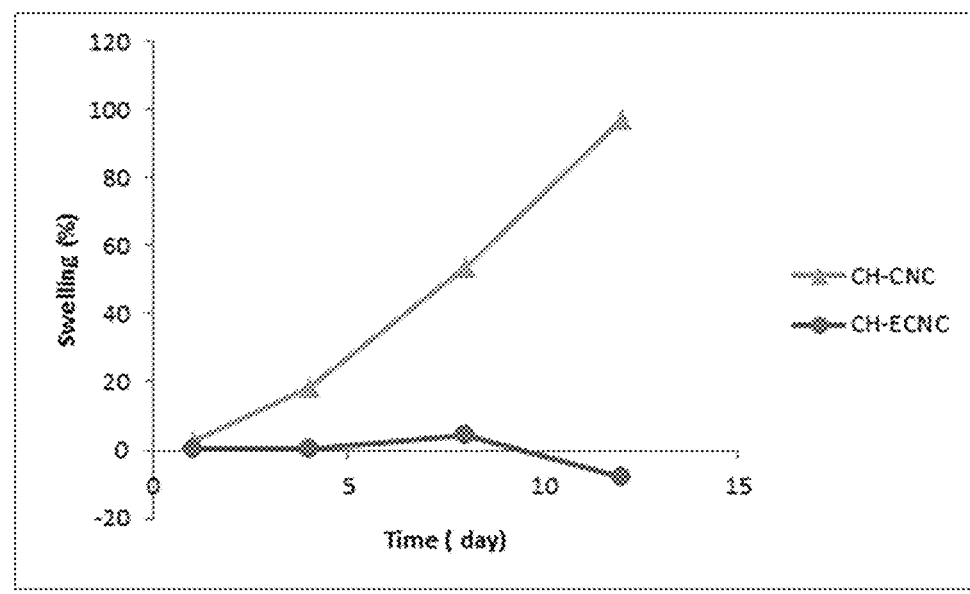
FIG. 15 illustrates the effect of cellulose (CNC and ECNC) content (w/w %) on swelling of chitosan based thin film.

FIG. 15 illustrates the effect of CNC and ECNC incorporation on the swelling percentages corresponds to the chitosan film. In the entire composite films matrix to filler material ratio was 3:2 ratio. Tremendous developments were observed on swelling property by adding a higher ratio of cellulose to chitosan matrix. Initially after 1 day both the films showed similar results with the incensement of S. Swelling percentage were measured for 12 days, and afterward S values was 97% for CH-CNC film. Water uptake property of the films ultimately depends on the nature of matrix and filler material interaction. Cellulose plays a role of an interpenetrated network within the chitosan matrix and inhibits the swelling in the water medium. Chemical cross-linking with hydrophilic chitosan matrix also prevents water absorption by composite. As provided in FIG. 15, it was observed water uptake for CH-CNC film was remarkably decreased. Highly crystalline CNC is less hydrophilic and makes complicated for water to penetrate the film. Other researchers have also reported that the swelling property of nano-composites decreased in water by the inhibition of three-dimensional networks formed by the hydrogen bonds between CNC and matrix. Completely different result was observed for CH-ECNC film. Water absorption was decreased and on day 8 was only 4% of S value. After 12 days instead of swelling it started to degrade by losing weight even from its initial weight. Due to the functionalization of nanocrystals turns into hydrophobic nature. And also extra network formed by the linkage between CH and ECNC that inhibit the water absorption. Weight degradation could be explained by the reaction took place between unreacted active carboxylate ion with the water molecule.

Thermogravimetric Analysis (TGA) of Thin Films

TGA analysis was performed for the mixture of two polymers, chitosan and cellulose. TGA curves are provided in FIG. 16 and DTG curves are presented in FIG. 17. The thermal degradation of neat chitosan film started at 212° C. with the maximum rate at 264° C. due to the secession of the chitosan backbone.

Figure 16:
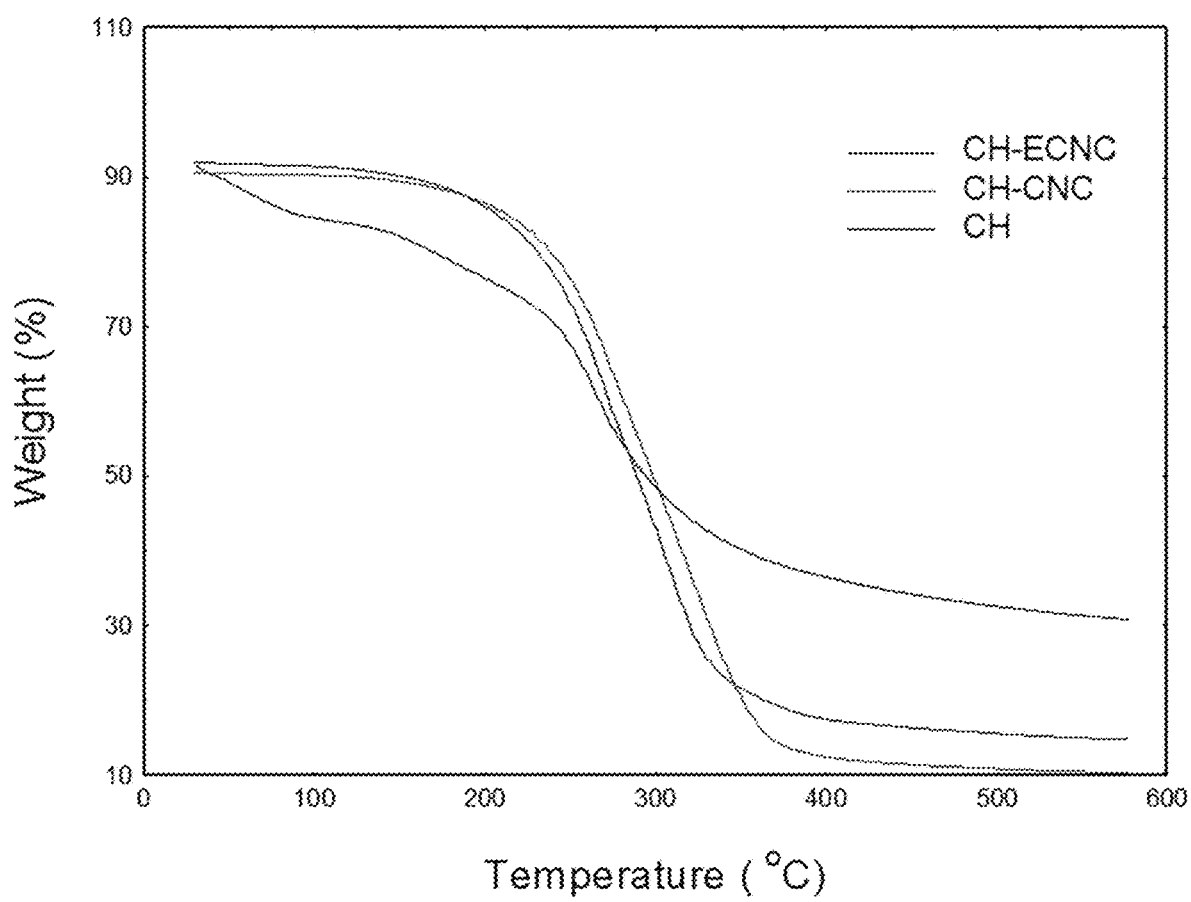
FIG. 16 provides the thermal gravimetric analysis (TGA) curves of the three thin films.
Figure 17:
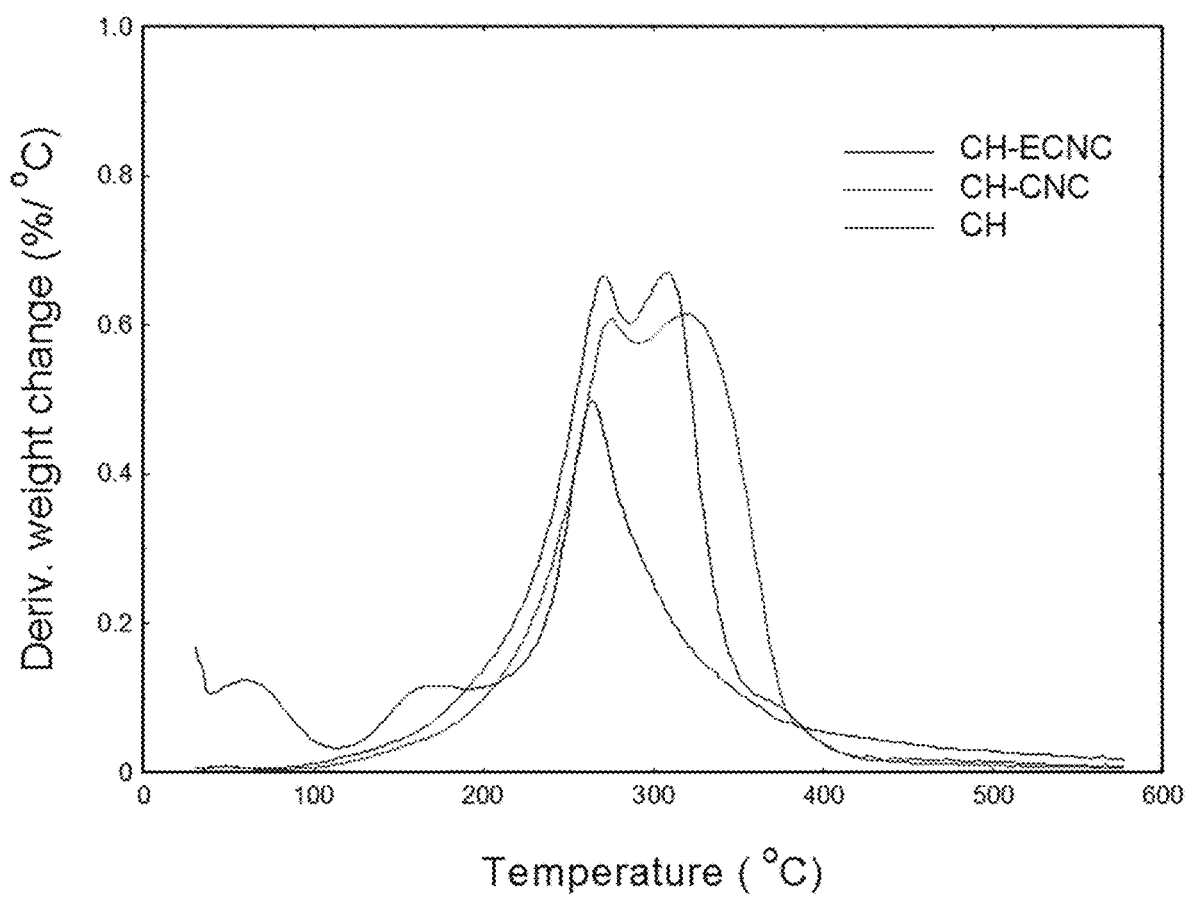
FIG. 17 provides the TGA curves of the three thin films.

FIGS. 16 and 17 presented the thermal behavior of CH-CNC and CH-ECNC films with the addition of CNC and ECNC into chitosan matrix, respectively. Three stages of thermal degradation were observed for both films. The first phase degradation was related to evaporation of moister content and the second decomposition region started ~215° C. with the major weight loss (35-40%), and this peak is mainly attributed due to the pyrolysis of cellulose and the structural decomposition of chitosan film. The third stage degradation started around 285° C. with the maximum temperature rate at 319° C. and 308° C. for CH-CNC and CH-ECNC films, respectively with weight loss of ~62%. It was observed that DTG peaks shifted towards higher temperature for CH-CNC and CH-ECNC films. Chitosan films after adding CNC and ECNC showed better thermal stability. This change may be explained that the sulfate ions and carboxylate ions presents in CNC and ECNC respectively, can interact strongly with the amino groups of chitosan compare to the hydroxyl groups present in cellulose. Thus, higher energy required breaking such interaction between CNC and chitosan.

TABLE 3.2

Summary of thermogravimetric analysis of thin films

| Specimen | Tensile Strength (TS) Mpa | Tensile Modulas (TM) Gpa | Elongation at break (EB) % |
|---|---|---|---|
| Neat – CH (a) | 25.04 ± 7.47 | 0.22 ± 0.08 | 36.75 ± 4.35 |
| CH + CNC (d) | 58.91 ± 3.49 | 0.43 ± 0.02 | 63.77 ± 2.28 |
| CH + ECNC (e) | 55.57 ± 2.42 | 1.00 ± 0.10 | 26.35 ± 2.55 |

Antimicrobial Activity

There are mainly three ways that the chitosan polymer can kill the microorganisms. Firstly, the positive charge of ammonium group in the chitosan chain can combine with the negative charge of a protein molecule in the membrane of microbial cells and block the nutrient exchange between the interior and exterior environment, leading to the bacterial death. Secondly, chitosan can directly interact with the DNA of bacteria and interrupt the synthesis of messenger RNA and, proteins, as well as suppress the reaction of various enzymes. In a third mechanism, chitosan as a chelating agent, can form complexes with the essential trace metal presence in the cell wall. In this work, the antimicrobial activity test was performed on CH, CH-CNC, and CH-ECNC films against *Salmonella Typhimurium, Yersinia enterocolitica, Listeria monocytogenes* and *Pseudomonas fluorescens*.

Experimentation Summary

CNC and ECNC were reinforced with chitosan matrix individually by the solution casting method. 2:3 ratios of cellulose and chitosan reinforcement results in best properties among prepared all reinforced composites. Chitosan was converted from chitin (shrimp shell). FTIR and XRD analysis confirmed the conversion of chitosan. Degree of deacetylation of chitosan was ~84% determined by FTIR method. Synthesis of ECNC was established by the FTIR analysis. Thin films were prepared and subjected to various tests to obtain mechanical, thermal, morphological, swelling and antimicrobial properties. Cellulose reinforcement enhances almost all the properties of films evaluated by TGA, Tensile, swelling, morphological and antimicrobial tests conducted. CNC reinforced thin film exhibited the best properties. The tensile strength of the reinforced films by the addition of CNC and ECNC enhanced the TS value up to 135% and 122% compare to the control chitosan film. Improvement of mechanical properties was due to the strong matrix-filler interaction by having both polymers similar structures. Outstanding progresses were observed on swelling property by adding a higher ratio of cellulose into chitosan matrix. ECNC reinforced film showed the highest water barrier property because of the steric hindrance and hydrophobic nature due to the functionalization of CNC. Improved thermal stability observed after adding cellulose that indicates the strong interaction between cellulose and chitosan. Bacteriostatic properties have been noticed for CNC and ECNC blended chitosan films and due to the higher antimicrobial activity of the films can be used as food packaging material to minimize the microbial growth.

The various preferred embodiments and experiments having thus been described, those skilled in the art will readily appreciate that various modifications and variations can be made to the aforementioned preferred embodiments without departing from the spirit and scope of the invention.

The invention claimed is:

1. A biodegradable film comprising:
   crystalline nano cellulose (CNC);
   esterified crystalline nano cellulose (ECNC); and
   chitosan;
   wherein CNC and ECNC is any ratio with an approximate weight between 40 to 50% of the film; and
   wherein the combination of CNC, ECNC and chitosan provide for tensile properties, water vapor barrier properties, antimicrobial properties, thermal properties, barrier and structural properties, non-toxicity properties, edibility properties, compostable properties and biodegradable properties for the biodegradable film.

2. The biopolymer film of claim 1, wherein CNC and ECNC are present in approximately a 70:30 ratio.

3. The biopolymer film of claim 1, wherein the chitosan is derived from crustacean exoskeletons.

4. The biopolymer film of claim 1, wherein the CNC and ECNC are derived from renewable agricultural sources.

5. The biopolymer film of claim 1, wherein the biopolymer film comprises an additive.

6. The biopolymer film of claim 1, further comprising at least one additives selected from a group consisting of: vanillin, ethylenediaminetetraacetic acid (EDTA), and stearic acid.

7. The biopolymer film of claim 6, wherein at least one additive is EDTA and the range of EDTA is between 40 to 50% wt. of the film.

8. The biopolymer film of claim 7, wherein the EDTA is EDTA dianhydride (EDTAD).

9. The biopolymer film of claim 6, wherein at least one additive is vanillin and the range of vanillin is between 40 to 50% wt. of the film.

10. The biopolymer film of claim 6, wherein at least one additive is stearic acid and the range of stearic acid is between 40 to 50% wt. of the film.

11. The biopolymer film of claim 6, wherein at least one additive is stearic acid and the range of stearic acid is between 0.8 to 1.0% wt. of the film.

12. The biopolymer film of claim 1, further comprising at least two additives selected from a group consisting of: vanillin, ethylenediaminetetraacetic acid (EDTA), and stearic acid.

13. The biopolymer film of claim 12, wherein the at least two additives are vanillin and stearic acid.

14. The biopolymer film of claim 1, wherein the chitosan is approximately 60% wt. of the film.

15. The biopolymer film of claim 1, wherein the CNC, ECNC, and chitosan are present in approximately a 2:2:3 ratio.

16. The biopolymer film of claim 15, further comprising at least two additives selected from a group consisting of: vanillin, ethylenediaminetetraacetic acid (EDTA), and stearic acid.

17. A biodegradable film comprising:
   crystalline nano cellulose (CNC);
   esterified crystalline nano cellulose (ECNC); and
   chitosan;
   wherein chitosan is an approximate weight of 40 to 60% of the film;
   wherein the CNC and ECNC is an approximate weight of 40% to 60% of the film; and
   wherein the combination of CNC, ECNC and chitosan provides for tensile properties, water vapor barrier properties, antimicrobial properties, thermal properties, barrier and structural properties, non-toxicity properties, edibility properties, compostable properties and biodegradable properties for the biodegradable film.

18. The biopolymer film of claim 17, wherein CNC and ECNC are present in approximately a 70:30 ratio.

19. The biopolymer film of claim 17, wherein the chitosan is derived from crustacean exoskeletons and the CNC and ECNC are derived from renewable agricultural sources.

20. The biopolymer film of claim 17, wherein the biopolymer film comprises an additive.

21. The biopolymer film of claim 20, wherein the additive is selected from a group consisting of: vanillin, ethylenediaminetetraacetic acid (EDTA), and stearic acid.

22. The biopolymer film of claim 17, wherein the CNC, ECNC and chitosan are present in approximately a 2:2:3 ratio.

* * * * *